Figure 1:
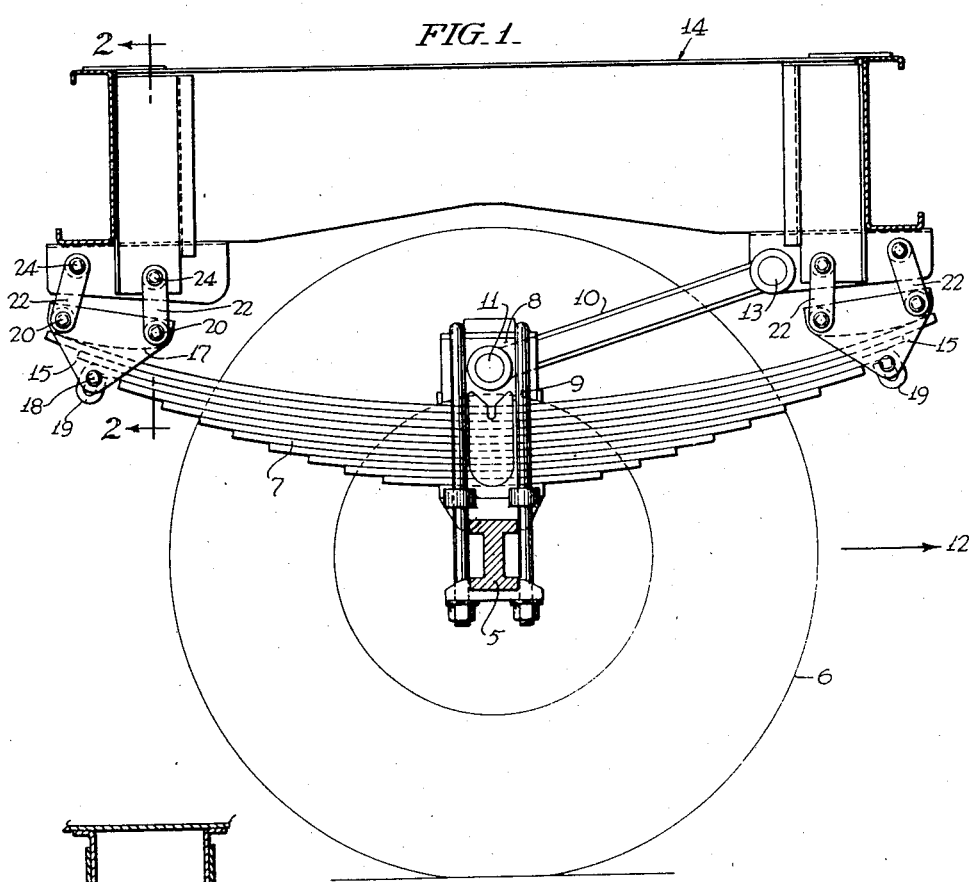

July 13, 1948.　　　C. P. POND　　　2,445,295

SPRING SUSPENSION

Filed Sept. 21, 1943

INVENTOR
Clarke P. Pond
BY John P. Tarbox
ATTORNEY

Patented July 13, 1948

2,445,295

UNITED STATES PATENT OFFICE 2,445,295

SPRING SUSPENSION

Clarke P. Pond, Philadelphia, Pa., assignor to The Budd Company, Philadelphia, Pa., a corporation of Pennsylvania Application September 21, 1943, Serial No. 503,186

2 Claims. (Cl. 267—54)

The invention relates to the mounting of springs especially for vehicles. More particularly, the invention relates to spring mountings for a vehicle which has to run with widely different loads and has to absorb irregularities of the road surface; such vehicles are especially trucks, trailers and semi-trailers.

The problem of proper springing becomes especially difficult with trailers and semi-trailers of light weight, high-strength construction, such as stainless steel construction, because here the ratio of the changing pay load to the unsprung dead weight becomes a maximum.

The object of the invention is to provide a construction which solves the above outlined problem, which is simple and sturdy, which automatically adapts itself to the changes of the pay load and which is free from undue friction and consequent wear between moving parts.

The objects of the invention are mainly achieved by providing supports or shoes for the ends of the leaf springs or for analogous parts of a spring arrangement of the type which shortens the effective length of the spring arms by the shape of the contact surface in combination with means, such as shackles, connecting said shoes to the vehicle frame and permitting them to follow the movement of the spring ends in the longitudinal direction thereof. This construction results in a rolling movement of the spring ends on its supports instead of the gliding movement of the known constructions.

Figure 2:
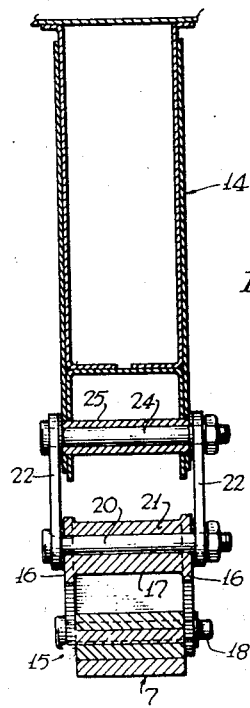

The principle of the invention and its details, and further objects and advantages thereof will be more fully understood from the embodiment shown in the attached drawing and described in the following:

In the drawing,

Figure 1 is a diagrammatic side elevation of a wheel suspension according to the invention and of adjoining parts of a vehicle structure, some of the latter in section; and Figure 2 is a fragmentary section along line 2—2 of Figure 1.

An axle 5 carries a road wheel 6. A leaf spring 7 is attached to the axle near the wheel by means of a bracket 8 and clips 9. A radius rod 10 is attached at 11 to the bracket 8 rotatably about an axis extending horizontally and transversely to the longitudinal direction of the vehicle. The rod 10 extends in the direction of travel indicated by the arrow 12 and has its other end journalled at 13 to the bolster construction 14 which may form part of the framework of the vehicle. The general construction of this bolster 14 will be understood from the drawing, but it is not described in detail because it does not form an essential part of the invention.

Each end of the spring 7 is engaged by a supporting member or shoe 15. This member has side walls 16 and a transverse wall 17 which extends generally in the longitudinal direction of the vehicle and the underside of which is curved as indicated in the drawing. The respective end of the spring 7 fits into the space between the walls 16 and its upper side rests against the curved underside of the wall 17. At some distance below the wall 17 a bolt 18 passes through and is secured to the walls 16. One of the leaves of the spring is provided with a loop 19 which extends around the bolt 18.

Above the wall 17 a pair of bolts 20 pass through and are rotatably supported in the end portions 21 of the member 15. The bolts extend horizontally and transversely to the direction of travel. Each end of each bolt 20 carries a link 22. The other ends of the links are attached to a second pair of bolts 24 which extend parallel to the bolts 20 and are rotatably supported in bushings 25 of the frame structure 14. The links 22 may be inclined relative to each other and their bolts may be arranged at different levels, as shown in Figure 1, so as to obtain a tilting movement for the supporting member 15.

The action of the new device is as follows: When the axle 5 and the center of the spring 7 move up and down under the influence of changes of load or of the unevenness of the road, they move relative to the frame 14 on an arc about the journal 13 for the radius rod 10. Moreover, the spring lengthens or shortens respectively as it is stretched into more straight form or permitted to assume it curved original form. The supporting members 15 are coupled to the spring ends by the bolts 18 and the loops 19 so that they are forced to move with the ends longitudinally relative to the frame 14 while there is lost motion in the direction of flexure of the spring insuring unimpeded contact between spring end and the curved underside of member 17. Such movement is made possible by the link or shackle connections 20, 22, 24 between the members or shoes 15 and the frame 14. As the spring stretches, its ends roll on the curved surfaces of the walls 17 so that the effective length of the spring is shortened thereby increasing its stiffness; vice versa, when the load is decreased, the spring assumes a more arcuate form, rolls on the surfaces 17 in the opposite direction, increases its effective length and gets thereby softer.

From the foregoing it will have become apparent that the new spring suspension adapts itself automatically to changes in load, that is, it gets stiffer when the load increases and softer when the load decreases. Moreover, it will have become evident that there is no sliding movement between the supporting members for the spring ends and the latter, which in previously known constructions resulted in undue wear and fatigue failures.

By using a shackle or link at or near each end of the shoe, the loads and operating stresses are vertically transmitted by the new progressive shoe and shackle arrangement.

Each shackle or link should be located in line with maximum stress for roller type contact without sliding action between spring and progressive shoe.

The retainer assembly 18, 19 is required to maintain contact between spring and progressive shoe so that the weight of the undercarriage is used for stability around curves and in other operating conditions causing tendency to sway or overturn. The retainer also holds the progressive shoe and the spring in the predetermined relation throughout all positions or spring deflection.

The bushings or bearings in the links or connections between shoe and chassis frame may have bushings or sleeves of fiber, rubber, or metal. The arc of movement is so small that it is practical to use a material that does not require frequent lubrication, or that may be used without lubrication.

The springs will be designed with the load capacity carefully calculated to produce good and stable riding qualities from light to maximum loads under normal operating conditions.

The curved line of the upper side of the spring and the lower side of the progressive shoe can be related to develop the load-carrying capacity throughout the maximum spring movement to at least equal the riding qualities of similar vehicles under like conditions that are equipped with helper or auxiliary springs.

A not-yet-mentioned advantage of the new construction consists therein that the underframe is relieved from horizontal stresses resulting from spring action and radius rod angularity.

The invention is, of course, not restricted to the described, diagrammatically illustrated embodiment, but it has to be adapted as indicated above to the specific conditions and problems of each vehicle construction and it is liable to many modifications which will occur to those skilled in the art. Protection is sought for the invention as expressed by the spirit and the language of the attached claims.

What is claimed is:

1. In a spring suspension: a leaf spring, a first structure, a second structure firmly connected to one point of said spring and guided with said point of the spring on a predetermined path relative to said first structure, a supporting member between said first structure and one end of said spring remote from said point thereof, said spring end and said member having mutually engaging contact surfaces divergently curved relative to each other so as to decrease the effective length of the spring when it is stretched with increase of load, means connecting said member and said first structure bodily movably in the longitudinal direction of the spring, and connecting means between said spring end and said member forming a positive connection against relative movement in the longitudinal direction of the spring and forming a lost motion connection enabling movement in the direction of flexure of the spring.

2. Connection between a structure and one end of a leaf spring, comprising a supporting member against which the end of the spring rests, contact surfaces between said spring and said member divergently curved relative to each other in the longitudinal direction of the spring, two sets of shackles journalled to said structure and said member at a distance from each other in the longitudinal direction of the spring adapting the member to participate in movements of the spring end relative to said structure when the spring changes its curvature under changing loads, said sets of shackles being inclined relative to each other so that each shackle extends about vertically to the adjacent portion of the spring when the spring contacts the supporting members at a point adjacent the respective shackles, and means connecting said spring and said member for movement together in the longitudinal direction of the spring.

CLARKE P. POND.

REFERENCES CITED

The following references are of record in the file of this patent:

UNITED STATES PATENTS

| Number | Name | Date |
| --- | --- | --- |
| 1,360,135 | Mohler | Nov. 23, 1920 |
| 1,609,436 | Stilwell | Dec. 7, 1926 |
| 1,615,376 | Goodrich | Jan. 25, 1927 |
| 1,722,426 | Kampfer | July 30, 1929 |
| 1,743,538 | Fry | Jan. 14, 1930 |
| 2,054,305 | Stilwell | Sept. 15, 1936 |
| 2,191,941 | Reid | Feb. 27, 1940 |
| 2,224,717 | Austin | Dec. 10, 1940 |
| 2,337,073 | Townsend | Dec. 21, 1943 |

FOREIGN PATENTS

| Number | Country | Date |
| --- | --- | --- |
| 157,023 | Great Britain | Jan. 20, 1921 |
| 193,161 | Great Britain | Feb. 22, 1923 |